United States Patent
Rostowfske et al.

(10) Patent No.: US 6,735,717 B1
(45) Date of Patent: May 11, 2004

(54) DISTRIBUTED COMPUTING SYSTEM CLUSTERING MODEL PROVIDING SOFT REAL-TIME RESPONSIVENESS AND CONTINUOUS AVAILABILITY

(75) Inventors: Bruce D. Rostowfske, Walnut, CA (US); Thomas H. Buscher, Pasadena, CA (US); Andrew W. Peck, Pasadena, CA (US); Peter G. Litskevitch, Monrovia, CA (US)

(73) Assignee: GNP Computers, Inc., Monrovia, CA (US)

(*) Notice: Subject to any disclaimer, the term of this patent is extended or adjusted under 35 U.S.C. 154(b) by 0 days.

(21) Appl. No.: 09/548,525

(22) Filed: Apr. 13, 2000

(51) Int. Cl.[7] .............................................. G06F 11/00
(52) U.S. Cl. ............................................ 714/13; 714/6
(58) Field of Search .................... 714/10, 13, 6, 714/4, 11, 15, 19, 12; 709/105

(56) References Cited

U.S. PATENT DOCUMENTS

| | | | | |
|---|---|---|---|---|
| 4,710,926 A | * | 12/1987 | Brown et al. | 714/4 |
| 5,157,663 A | * | 10/1992 | Major et al. | 714/10 |
| 5,177,744 A | * | 1/1993 | Cesare et al. | 714/6 |
| 5,559,991 A | * | 9/1996 | Kanfi | 711/162 |
| 5,621,885 A | * | 4/1997 | Del Vigna, Jr. | 714/13 |
| 5,664,090 A | * | 9/1997 | Seki et al. | 714/15 |
| 5,701,482 A | * | 12/1997 | Harrison et al. | 709/105 |
| 5,796,934 A | * | 8/1998 | Bhanot et al. | 714/4 |
| 5,812,748 A | * | 9/1998 | Ohran et al. | 714/4 |
| 5,867,657 A | | 2/1999 | Bolosky et al. | |
| 5,968,185 A | * | 10/1999 | Bressoud et al. | 714/10 |
| 5,978,565 A | * | 11/1999 | Ohran et al. | 714/13 |
| 6,035,417 A | * | 3/2000 | Kanazawa | 714/13 |
| 6,085,217 A | * | 7/2000 | Ault et al. | 709/105 |
| 6,195,760 B1 | * | 2/2001 | Chung et al. | 714/4 |
| 6,212,521 B1 | | 4/2001 | Minami et al. | |
| 6,247,141 B1 | * | 6/2001 | Holmberg | 714/2 |
| 6,253,230 B1 | | 6/2001 | Couland et al. | |
| 6,292,905 B1 | | 9/2001 | Wallach et al. | |
| 6,347,397 B1 | | 2/2002 | Curtis | |
| 6,378,128 B1 | | 4/2002 | Edelstein et al. | |
| 6,385,636 B1 | | 5/2002 | Suzuki | |
| 6,490,610 B1 | * | 12/2002 | Rizvi et al. | 709/101 |
| 6,502,134 B1 | * | 12/2002 | Makarios et al. | 709/225 |
| 6,519,712 B1 | * | 2/2003 | Kim et al. | 714/15 |

OTHER PUBLICATIONS

"Fault–tolerant Parallel Processing Combining Linda, Checkpointing, and Transactions" By Karpjoo Jeong, A dissertation in the Department of Computer Science submitted to the faculty of the Graduate School of Arts and Science in partial fulfillment of the requirements for the degree of Doctor of Philosophy at New York University; Jan., 1996; pp. 1–92.

(List continued on next page.)

Primary Examiner—Robert Beausoliel
Assistant Examiner—Gabriel L. Chu
(74) Attorney, Agent, or Firm—O'Melveny & Myers LLP (57) ABSTRACT

A distributed computing system comprises a primary server having a primary virtual shared memory and a back-up server having a back-up virtual shared memory. The primary server periodically provides a state table to the back-up server in order to synchronize the virtual shared memory and the back-up virtual shared memory. A plurality of client computer resources are coupled to the primary server and the back-up server through a network architecture. The client computer resources further comprise plural worker processes each adapted to independently perform an operation on a data object disposed within the primary virtual shared memory without a predetermined assignment between the worker process and the data object. Upon an unavailability of either the primary server or the back-up server, the worker process performs the operation on the corresponding data object disposed within the back-up virtual shared memory. The client computer resources further comprise plural input/output (I/O) ports adapted to receive incoming data packets and transmit outgoing data packets.

17 Claims, 3 Drawing Sheets

OTHER PUBLICATIONS

"Virtual Shared Memory and the Paradise System for Distributed Computing" Scientific Computing Associates, Inc.; Apr. 20, 1999; pp. 1–18.

"Persistent Linda: Linda + Transactions + Query Processing" By Brian G. Anderson, Teradata Corp. and Dennis Shasha; Courant Institute, New York University; pp. 1–17.

"An Approach to Fault–tolerant Parallel Processing on Intermittently Idle, Heterogeneous Workstations" By Karpjoo Jeong, Laboratory for Nuclear Studies—Cornell University and Dennis Shasha, Surendranath Talla, and Peter Wyckoff—Department of Computer Science, New York University; pp. 1–9.

"A Transactional/Checkpointing Approach to Fault Tolerant Linda" By Karpjoo Jeong and Dennis Shasha, Courant Institute of Mathematical Sciences, New York University; pp. 1–10.

"PLinda User Manual" By Thomas Brown, Karpjoo Jeong, Bin Li, Suren Talla, Peter Wyckoff and Dennis Shasha; Courant Institute of Mathematical Sciences, New York University; Jan. 8, 1997; pp. 1–28.

"Adding Fault–Tolerant Transaction Processing To Linda" By Scott R. Cannon & David Dunn: Software Practice & Experience, vol. 24(5), pp. 449–466 May 1, 1994, John Wiley & Sons Ltd. Chichester, GB.

"Supporting Fault Tolerant Parallel Programming in Linda" By David E. Bakken & Richard D. Schlichting: IEEE Transactions on Parallel and Distributed Systems, IEEE New York, vol. 6, No. 3, Mar. 1, 1995, pp. 287–302.

"Replication in the Harp File System" By Liskov et al: Operating Systems Review(Sigops), ACM Headquarter, New York vol.25, No. 5, 1991, pp. 226–238.

* cited by examiner

DISTRIBUTED COMPUTING SYSTEM CLUSTERING MODEL PROVIDING SOFT REAL-TIME RESPONSIVENESS AND CONTINUOUS AVAILABILITY

BACKGROUND OF THE INVENTION

1. Field of the Invention

The present invention relates to distributed computer processing systems, and more particularly, to a clustering model for plural computing units utilizing a virtual shared memory to provide real-time responsiveness and continuous availability.

2. Description of Related Art

With the constantly increasing complexity of scientific, engineering and commercial applications, there is a high demand for systems providing large amounts of computing power. For many such applications, mainframe computer systems represent a traditional solution in view of their ability to perform enormous numbers of computations at very high speeds. Such mainframe computers have significant drawbacks, chiefly being their high cost due in part to their use of highly customized hardware and software developed specifically for each particular application. Moreover, mainframe computers cannot be easily scaled to provide additional capacity as demand increases. An additional drawback of mainframe computers is that they represent a single point of failure. It is necessary to provide redundant computer systems for applications demanding a high degree of system availability, such as telecommunications applications, thereby further increasing the cost and complexity of such systems.

As an alternative to mainframe computer systems, distributed computing systems have been developed in which a plurality of computing units (e.g., personal computers or workstations) are connected to a client-server network. In a distributed computing system, the computational power of the overall system is derived from the aggregation of separate computing units. The primary advantages of such distributed systems are reduced cost and scalability, since each computing unit may be provided using standard commercial hardware and software, and the computing system may be expanded as necessary by simply adding more computing units to the network. A drawback of distributed computing systems is that it is difficult to develop software applications that can coordinate the disparate processes performed on the separate computing units. These processes include the sharing of data between the computing units, the creation of multiple execution units, the scheduling of processes, and the synchronization of the processes. Another drawback of distributed computing systems is providing fault tolerance. When the computing units are executing long-running parallel applications, the probability of a failure increases as execution time or the number of computing units increases, and the crash of a single computing unit may cause the entire execution to fail.

Various fault-tolerant parallel programming models have been developed to address these and other drawbacks of distributed computing systems. One such model is Linda, a parallel computation model based on a virtual shared memory. In Linda, processes in an application cooperate by communicating through the shared memory, referred to as "tuple space." Each "tuple" within the tuple space contains a sequence of typed data elements that may take any of various forms, including integers, floats, characters, arrays of data elements, and the like. Processes access tuple space using four basic operations, including: "out" for tuple creation; "eval" for process creation; "in" for destructive retrieval; and "rd" for non-destructive retrieval. An advantage of Linda is that communication and synchronization via the tuple space are anonymous in the sense that processes do not have to identify each other for interaction. A variant of Linda, known as Persistent Linda or PLinda, supports fault tolerance and is applicable for using idle computing units for parallel computation. PLinda adds a set of extensions to the basic Linda operations that provides fault tolerance by periodically checkpointing (i.e., saving) the tuple space to non-volatile memory (i.e., disk storage). This way, the tuple space can be restored in the event of a catastrophic system failure.

While such fault-tolerant parallel programming models using virtual shared memory are advantageous for solving certain types of mathematical and/or scientific problems, they are impractical for many other real-time applications. Specifically, certain applications require a high level of computation accuracy, such as analysis of high energy physics data or calculation of pricing for financial instruments. For these applications, a lower level of system availability to accommodate periodic-maintenance, upgrades and/or system failures is an acceptable trade-off as long as the computation results are accurate. The Linda or PLinda programming model is well suited for these applications. On the other hand, certain real-time applications require a high level of system availability and can therefore accept a somewhat lower level of computation accuracy. For example, it is acceptable for a telecommunications server to occasionally drop a data packet as long as the overall system remains available close to 100% of the time. Such highly demanding availability requirements allow only a very limited amount of system downtime (e.g., less than three minutes per year). As a result, it is very difficult to schedule maintenance and/or system upgrades, and any sort of global system failure would be entirely unacceptable.

Accordingly, a critical need exists for a distributed computing system having a fault-tolerant parallel-programming model that provides real-time responsiveness and continuous availability.

SUMMARY OF THE INVENTION

The present invention is directed to a distributed computing system that provides real-time responsiveness and continuous availability while overcoming the various deficiencies of the prior art.

An embodiment of the distributed computing system comprises a primary server having a primary virtual shared memory and a back-up server having a back-up virtual shared memory. The primary server periodically provides a state table to the back-up server in order to synchronize the virtual shared memory and the back-up virtual shared memory. A plurality of client computer resources are coupled to the primary server and the back-up server through a network architecture. The client computer resources further comprise plural worker processes each adapted to independently perform an operation on a data object disposed within the primary virtual shared memory without a predetermined assignment between the worker process and the data object. Upon unavailability of the primary server, the worker process performs the operation on the corresponding data object in the back-up virtual shared memory within the back-up server. The client computer resources further comprise plural input/output (I/O) ports adapted to receive incoming data packets and transmit outgoing data packets.

There are plural types of worker processes, and each worker process may be adapted to perform a distinct type of function. One type of worker process further comprises an input worker process adapted to retrieve an incoming data packet from an I/O port and place a corresponding data object on the primary virtual shared memory. Another type of worker process further comprises an output worker process adapted to remove a data object from the primary virtual shared memory and deliver a data packet to an I/O port. The remaining worker processes operate by grabbing a data object having a predefined pattern from the said primary virtual shared memory, processing the data object in accordance with a predefined function, and returning a modified data object to the primary virtual shared memory.

A more complete understanding of the distributed computing system clustering model will be afforded to those skilled in the art, as well as a realization of additional advantages and objects thereof, by a consideration of the following detailed description of the preferred embodiment. Reference will be made to the appended sheets of drawings which will first be described briefly.

DETAILED DESCRIPTION OF THE PREFERRED EMBODIMENT

The present invention satisfies the need for a distributed computing system having a fault-tolerant, parallel-programming model that provides real-time responsiveness and continuous availability.

Figure 1:
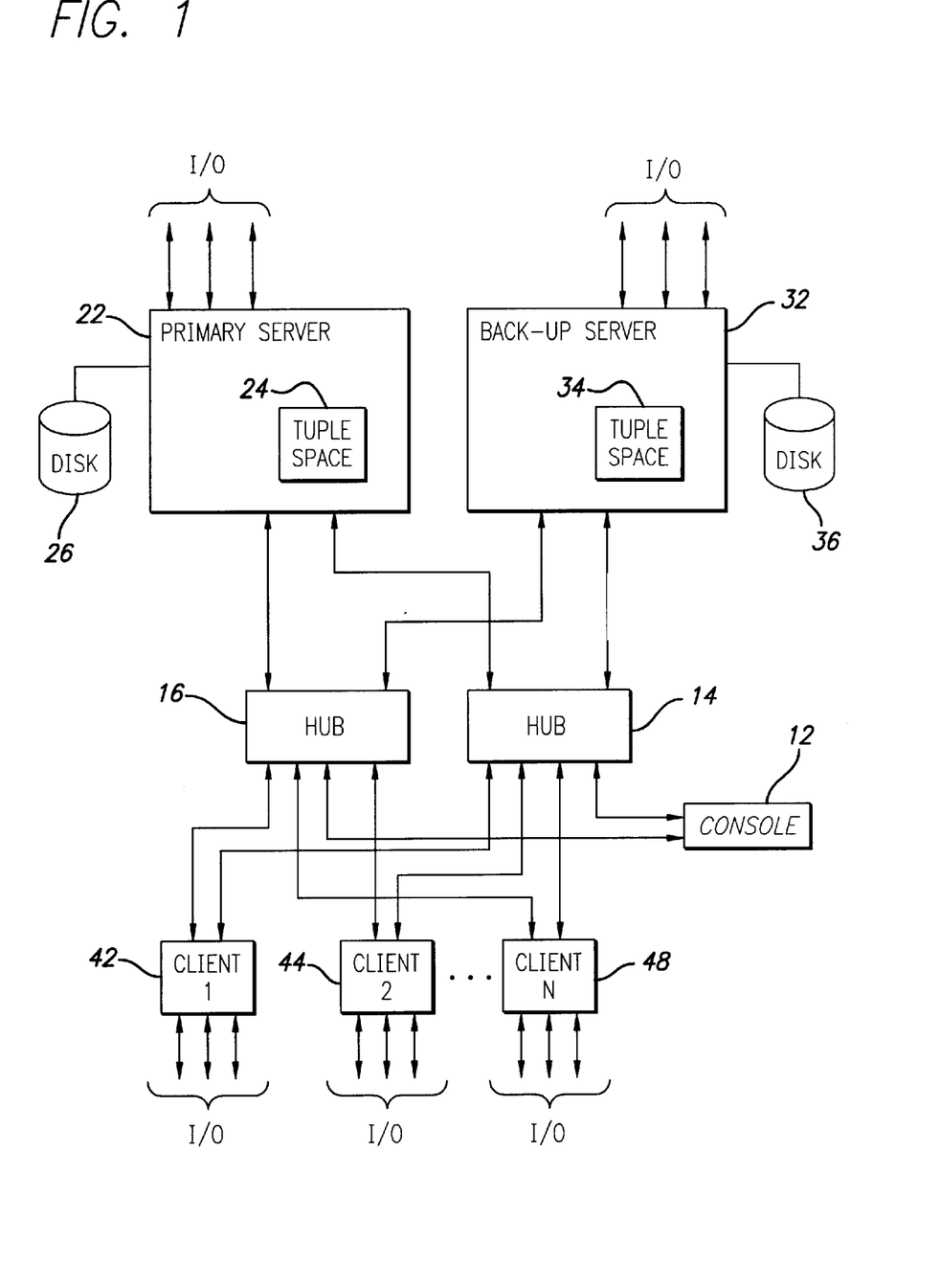
FIG. 1 is a block diagram illustrating an embodiment of the distributed computing system clustering model in accordance with the present invention.

Referring first to FIG. 1, a block diagram is illustrated of a distributed computing system clustering model in accordance with an embodiment of the present invention. The distributed computing system comprises plural nodes including a primary server 22, a back-up server 32, and a plurality of clients (1 through N) 42, 44, 48 that are connected together in a local area network through hubs 14, 16. The primary and back-up servers 22, 32 communicate with each other and with the clients 42, 44, 48 using an application-data-exchange protocol that implements the semantics of tuple space operations (described below). This tuple space application protocol relies on and is compatible with an underlying conventional network protocol, such as Ethernet or Token Ring. The primary server 22, back-up server 32 and clients 42, 44, 48 each represents a communication node of the network.

Each of the communication nodes of the distributed computing system of FIG. 1 may physically comprise a separate computing unit (e.g., personal computer, workstation, and the like), or plural communication nodes may be provided by a separate processes executing within a single computing unit. For example, the primary server 22 and one or more of the clients 42, 44, 48 may actually be provided within a single computing unit. Each such computing unit typically comprises a processor and random access memory (RAM). As used herein, the term "processor" is intended to broadly encompass microprocessors, digital signal processors (DSPs), application specific integrated circuits (ASICs), field programmable gate arrays (FPGAs), and the like. Each of the clients 42, 44, 48, as well as the primary server 22 and the back-up server 32, further include plural input/output (I/O) ports. The I/O ports allow data and/or signals to be provided to/from the network through any node. In turn, the I/O ports may then be coupled to other external systems, such as other computer networks or the Internet. A console 12 is coupled to the primary and back-up servers 22, 32 through one of the nodes 14, 16, and comprises a process executing on a computing unit similar to the clients 42, 44, 48. Unlike the clients, the console 12 provides the specific function of allowing a user to enter management commands and information into the network, and to monitor the operational status of the network. The console 12 may be further coupled to an input device (e.g., keyboard, mouse, scanner, etc.), and a video monitor or other visual display device to provide a visual output to the user.

The primary server 22 further includes a non-volatile memory, i.e., disk storage 26, and a random access memory (RAM) that is accessible by each of the clients 42, 44, 48 as well as the console 12 using the tuple space application protocol, in order to provide a virtual shared memory (also referred to herein as tuple space) 24. Similarly, the back-up server 32 further includes a non-volatile memory, e.g., disk storage 36, and a random access memory (RAM) that is accessible by each of the clients 42, 44, 48 as well as the console 12 in order to provide a back-up virtual shared memory (i.e., back-up tuple space) 34. As will be further described below, the virtual shared memory 24 and back-up virtual shared memory 34 each provides a space within which data objects (i.e., tuples) may be placed. The tuples may be heterogenous, meaning that different types of data objects may share the virtual shared memory 24. The virtual shared memory 24 of the primary server 22 and the back-up virtual shared memory 34 of the back up server 32 are synchronized together by communication of a state table between the primary server 22 and back-up server 32. The tuple space may be used as a programming interface for a relational database, cluster database, data object repository, and the like, and portions of the virtual shared memory 24, 34 may rely on implementations of those database types. Whenever the state of a tuple within the tuple space on the primary server 22 is changed, i.e., by adding, changing or deleting a tuple, the state table is updated so that the tuple space on the back-up server 32 reflects the change. The state table may also be stored in the disk memory 26 to provide a permanent archive of the tuple space to be accessed in the event of failure of one or both of the primary server 22 and the back-up server 32.

The clients 42, 44, 48 each provide processing resources for retrieving, storing and processing the data objects (i.e., tuples) within the tuple space. There is no assigned relationship between the clients and the tuples, so that any client may access any tuple as long as there is a match between the type of worker process executing on the client and the particular tuple (described in greater detail below). Additional processing resources may be added to the network by simply connecting additional clients to one of the hubs 14, 16. Moreover, the computing units that provide the clients 42, 44, 48 need not be equal in terms of processing power and/or speed.

Figure 2:
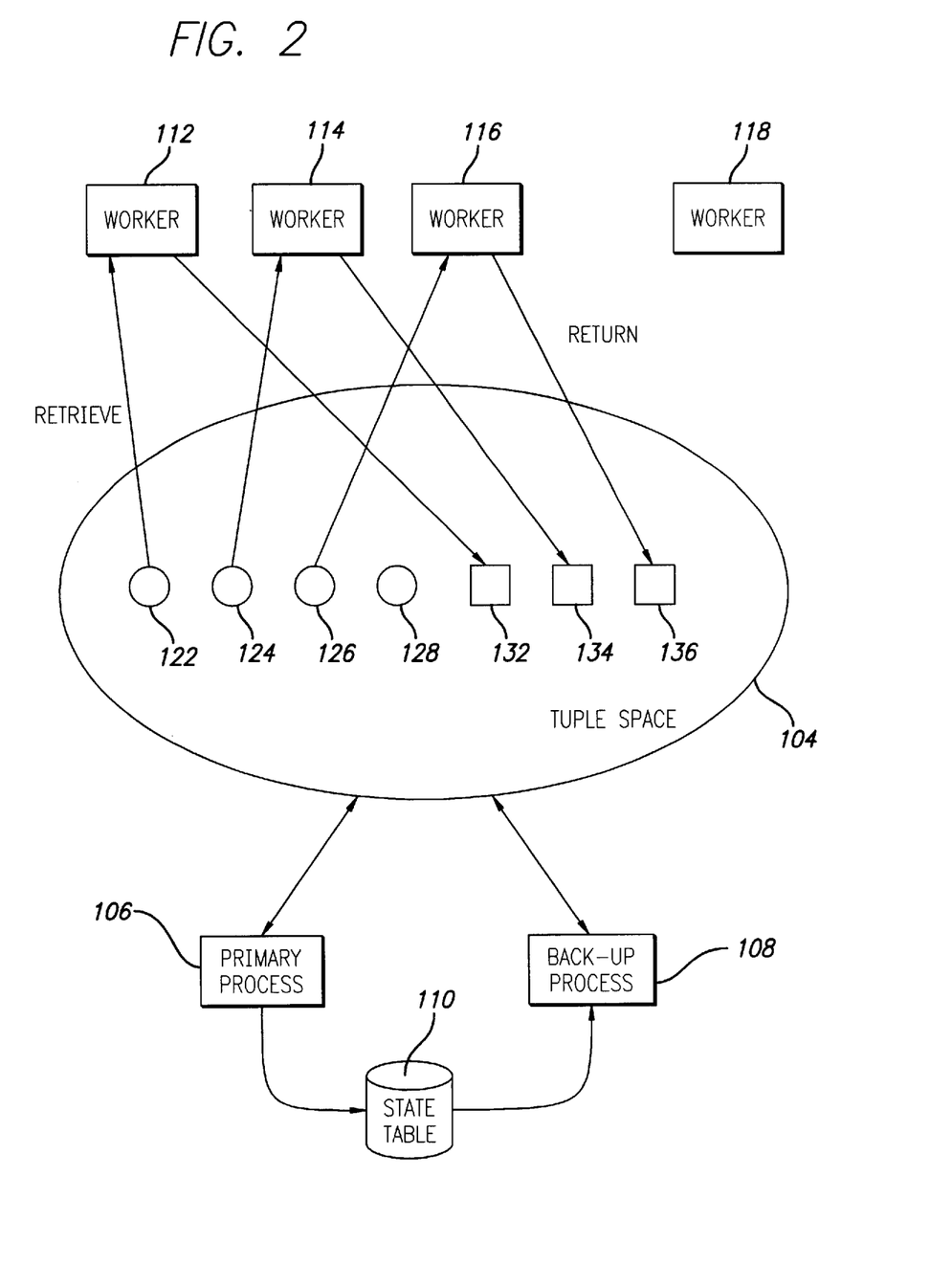
FIG. 2 is a logic diagram illustrating transactions involving data objects within virtual shared memory.

Referring now to FIG. 2, a logic diagram illustrates exemplary operations involving data objects within the virtual shared memory or tuple space 104. The tuple space 104 contains a plurality of tuples, including a first type of tuple 122, 124, 126, 128 (represented as circles) all having a common data format, and a second type of tuple 132, 134, 136 (represented as squares) all having a common data format distinct from that of the first type of tuple. Although two types of tuples are illustrated for purposes of simplicity, it should be appreciated that there is no limit to the number of types of tuples that may be present in the tuple space. Each type of tuple has a distinctive data format, and may be utilized to represent a different type of information. The logic diagram further illustrates plural worker processes 112, 114, 116, 118 that may be executing on one or more of the clients (described above). Each worker process performs a type of operation on a tuple within the tuple space 104. For example, worker process 112 retrieves a first type of tuple 122 from the tuple space 104, then performs some processing on the data contained within the tuple, and then returns a second type of tuple 132 to the tuple space 104. In the exemplary second type of tuple 132, the data contained in the tuple has between transformed from a first state to a second state. As described above, the primary process 106 operating on the primary server 22 maintains the state of the tuple space 104, and provides a state table 110 to the back-up process 108 operating on the back-up server. A copy of the state table 110 may be transferred every time there is a change in state of the tuple space 104.

With certain critical types of data objects, such as system configuration settings or user account and billing information, it may be desirable to store tuples in such a way that they can be recovered in the event of a failure of both primary and back-up servers 22, 32. For this purpose, a tuple may be identified as "persistent" by the worker process that creates it; the primary and back-up servers 22, 32 store the contents of such persistent tuples in non-volatile memory, such as disk or flash memory, in addition to the copy in the virtual shared memory. On recovery from a failure of one or both servers, the persistent tuples are re-constituted in virtual shared memory from the data stored in non-volatile memory.

The operations that are performed on the tuples within the tuple space may be grouped into transactions. More particularly, a transaction comprises a set of operations having the properties of atomicity, isolation and durability. Atomicity refers to the characteristic that all operations within a transaction necessarily take effect (i.e., commit), or none execute (i.e., abort). Thus, there can be no partial execution of a transaction. Isolation refers to the characteristic that even if there are multiple, concurrent transactions in progress, operations within one transaction take effect as if there were no other transactions running at the same time. Durability refers to the characteristic that when a transaction commits, its effects are retained in the face of any failures that may occur later. It should be appreciated that a transaction is only durable if the tuple is identified as being persistent, i.e., its contents are stored on disk or other stable media. When applied properly, a transaction ensures that desired data consistency conditions are maintained in the tuple space, even in the event of unanticipated hardware or software failures. This makes recovery from failures more effective (and, in some cases, possible) than would otherwise be the case, and contributes to the high availability of the system as will be further described below. Moreover, the data transfer protocol between the primary and back-up servers 22, 32, and between the clients 42, 44, 48 and the back-up server during recovery from a failure of the primary server, ensures that the transaction properties hold in the event of a failure of a client or the primary server.

Figure 3:
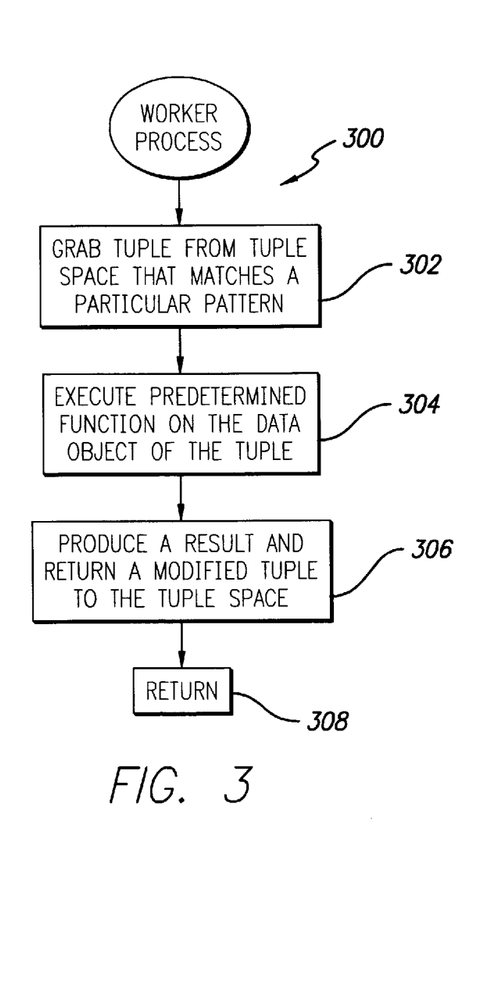
FIG. 3 is a flow chart illustrating an exemplary worker process performed on a data object.

FIG. 3 illustrates an exemplary worker process 300 that comprises a simplified transaction. At step 302, the worker process grabs an available tuple from the tuple space 104. This step may execute the Linda "in" or "rd" operations whereby a typed pattern for a tuple is selected as an argument, and a tuple is retrieved from the tuple space 104 that matches the typed pattern in an associative manner. If the "in" operation is performed, the tuple is destroyed, i.e., permanently removed, from the tuple space. Conversely, if the "rd" operation is performed, a copy of the tuple remains in the tuple space. As noted above, there is no assignment or mapping of worker processes to the tuples, and any worker process may grab any available tuple that matches the pattern defined by the worker process. At step 304, the data contained within the tuple is processed in some manner by executing a predetermined function on the data. Plural worker processes may perform the same function, or each worker process may perform a unique function. In a preferred embodiment of the invention, the tuple space permits multi-threading and a single worker process may thereby perform multiple functions. At step 306, the worker process produces a result and returns a new tuple to the tuple space 104. This step may execute the Linda "out" operation whereby a sequence of typed expressions is taken as an argument. A new tuple is constructed from the sequence, and is inserted into the tuple space. At step 308, the worker process then returns to the beginning and repeats itself. In this manner, the worker processes will continually grab available tuples and process them accordingly. It should be appreciated that more complex transactions may include multiple "in," "rd" and "out" operations.

Ordinarily, the worker processes do not maintain any state data regarding the tuple. In the event of a failure of a worker process, any intermediate data products formed within the process may be lost. By virtue of the transaction properties, however, the contents of tuple space will reflect either the complete intended effect of the worker process, or the conditions that prevailed just before the worker process began to handle the transaction. In the latter case, another worker process (of the same type) can handle the transaction.

Figure 4:
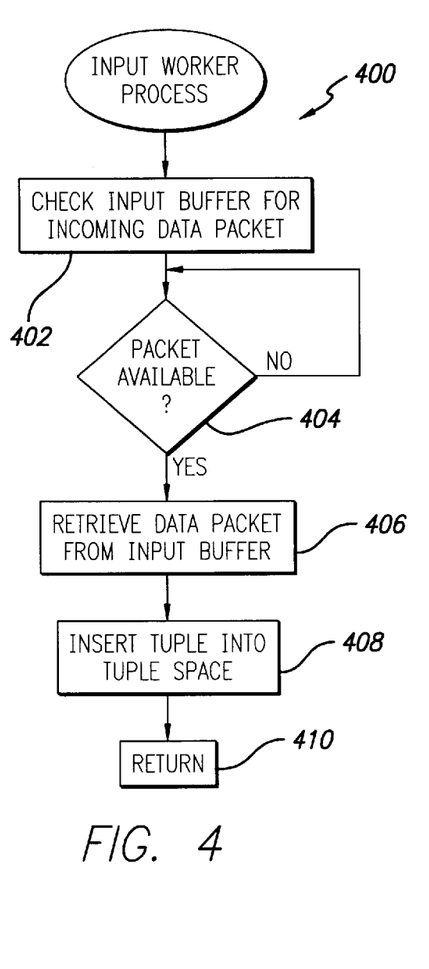
FIG. 4 is a flow chart illustrating an exemplary input worker process performed on an incoming data packet.

Since the distributed computing system is intended to operate in a real-time processing environment, specific worker processes are provided to perform input and output functions. FIG. 4 illustrates an exemplary input worker process 400 with reference to the block diagram of FIG. 1. As known in the art, an incoming data packet received at one of the I/O ports of the primary server 22, back-up server 32 or the clients 42, 44, 48 would be written to a memory space that provides an input buffer. The operating systems of the communication nodes typically include Application Program Interfaces (API) adapted to handle the retrieval of data packets from the input buffer. At step 402, the input worker process checks the input buffer of the I/O ports for the presence of a received data packet. Next, at step 404, the input worker process determines whether a data packet is present. If no data packet is present, the input worker process will wait until a data packet arrives. When a data packet arrives at the input buffer, the process passes to step 406 at which the data packet is retrieved from the input buffer. Then, at step 408, the data packet is converted into a tuple and is inserted into the tuple space 104 using a Linda "out" operation. At step 410, the input worker process then returns to the beginning and repeats again. By operation of the input worker process, any incoming data packets received by the distributed computing system from an external system are moved into the tuple space 104 to enable further processing.

Figure 5:
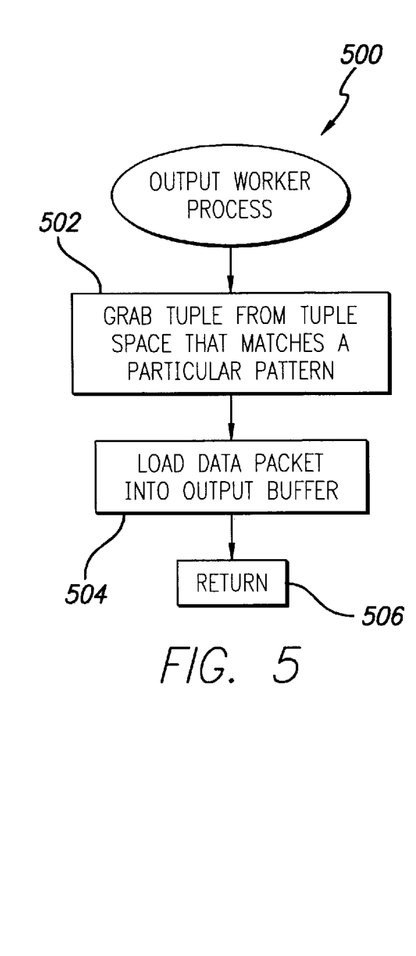
FIG. 5 is a flow chart illustrating an exemplary output worker process performed on an outgoing data packet.

FIG. 5 illustrates an exemplary output worker process 500 with reference to the block diagram of FIG. 1. As known in the art, an outgoing data packet to be transmitted from one of the I/O ports of the primary server 22, back-up server 32 or the clients 42, 44, 48 would be written to a memory space that provides an output buffer. The operating systems of the communication nodes typically include device drivers adapted to handle the loading of outgoing data packets into the output buffer. At step 502, the output worker process grabs an available tuple from the tuple space 104 using the Linda "in" operation whereby a tuple is retrieved from the tuple space 104 that matches the typed pattern in an associative manner. Next, at step 504, the output worker process loads a data packet containing the data of the retrieved tuple into the output buffer. At step 506, the output worker process then returns to the beginning and repeats again. By operation of the output worker process, any tuples that contain fully processed data are converted into data packets and transmitted from the distributed computing system to an external system.

As described above, communication between any of the nodes and the tuple space is performed in accordance with known network protocols. In accordance with such protocols, data frames communicated between the nodes specify a destination address in the header of the frame. Referring again to FIG. 1, when a client transmits a data frame to the primary server 22, such as to write a tuple to the tuple space, the header will identify the primary server in the frame header. The sending node starts a timer with the transmission of the data frame. The primary server 22 will return an acknowledgment back to the client reflecting the satisfactory receipt of the data frame. In the event that the primary server 22 fails during the operation of the distributed computing system, the acknowledgement will not be returned to the sending node. If an acknowledgement is not received within a predetermined period of time determined by the timer, the sending node will resend the data frame specifying the back-up server 32 in the frame header. Since the back-up tuple space 34 is identical to the primary tuple space 24, the distributed computing system continues to operate without impact even though the primary server 22 has failed. When the primary server 22 returns to operational status, the back-up server 32 passes a copy of the state table back to the primary server to again synchronize the respective tuple spaces 24, 34.

There are significant advantages to the distributed computing system described above. Since there is no assignment between worker processes and tuples, work units are processed as part of a virtual process thread. In traditional computing architectures, a work unit is processed as part of a predefined thread of instructions. Traditional multitasking environments have multiple threads of execution taking place concurrently within the same program with each thread processing a different transaction or message. In contrast, the tuple space of the present distributed computing system provides a virtual process thread whereby a work unit may be acted upon or processed by plural worker processes physically executing on different computing units. This virtual process thread provides distinct advantages over traditional computing architectures in terms of reliability, scalability and load balancing.

Specifically, the distributed computing system provides high reliability and continuous availability in view of the redundant tuple spaces 24, 34 on the primary and back-up servers 22, 32, respectively. If one of the primary and back-up servers 22, 32 becomes unavailable, such as due to a failure or routine maintenance, the distributed computing system keeps operating without a noticeable impact on performance. A failure of any of the clients 42, 44, 48, or the worker processes executing thereon, would only affect the individual tuples being processed by that client, and would have no effect on the overall system. In the worst case, an individual incoming data packet might be lost (e.g., corresponding to a single telephone call), which is acceptable for many applications.

Moreover, the distributed computing system provides natural load balancing. Since there is no assignment between worker processes and tuples, the work available on the tuple space becomes distributed between the available client computing resources as a natural outgrowth of the autonomous character of the worker processes. Similarly, additional worker processes can be created as needed to accommodate changes in load. Individual worker processes may be adapted to provide a function of measuring the throughput rate of data through the system, such as by measuring the amount of time that a tuple remains in the tuple space before being grabbed by a worker process. If the amount of time exceeds a predetermined limit (i.e., too much work and not enough workers), the worker process may launch an additional worker process; conversely, if the amount of time is below a predetermined limit (i.e., too little work and too many workers), the worker process may terminate a worker process. This way, the throughput rate can be regulated.

The nature of the data transfer protocol between the clients and the servers, as well as the structure of the server process, permits "soft" real time processing. Unlike "hard" real time processing in which there are strict time limits in the processing of work units, the present distributed computing system attempts to ensure that any delay between the receipt of a request packet arriving at an I/O port and a responsive packet being transmitted from an I/O port is kept below a tunable limit for most transactions. This is accomplished by regulating the number of worker processes that are operative on the tuple space, wherein additional worker processes are added if processing delays exceed some predetermined limit. "Soft" real time processing is acceptable for many types of applications that don't require processing within strict time limits, such as telecommunications applications.

The distributed computing system also provides a high degree of scalability. Client computing resources can be added to the network in order to increase the capacity of the system, limited primarily by the switching capacity of the hubs 14, 16. Similarly, new functions can be migrated onto the network simply by adding new or different worker processes to the client computing resources.

It should be appreciated that the distributed computing system described above would be particularly well suited to numerous real-time applications. By way of example, the distributed computing system could be adapted to operate as a telecommunications server, switch, or Service Switching Point (SSP) that handles the switching of telephone calls between plural trunk lines. As known in the art, narrow band switching signals are communicated between the SSPs to identify destination and other information associated with telephone traffic on the trunk lines. The SSPs receive the switching signal data packets and determine the routing of the telephone traffic in accordance with various routing algorithms. An SSP constructed in accordance with an embodiment of the present distributed computing system may include plural worker processes that execute the algorithms in accordance with a virtual process thread. For example, the SSP may include an input worker process that receives incoming switching signals and writes a corresponding tuple to the tuple space. Another worker process may grab the tuple, perform a first level of processing, and write a modified tuple to the tuple space. Yet another worker process may grab the modified tuple, perform a second level of processing, and write a further modified tuple to the tuple space. Lastly, an output worker process may grab the further modified tuple and produce an outgoing switching signal that controls the routing of the associated telephone call. Many other real time applications would equally benefit from the present distributed computing system, such as Internet protocol hubs, routers, switches, Web servers, voice processors, e-mail servers, and the like. The present distributed computing system is particularly well suited to high availability telecommunications applications since it allows committed transactions to be lost occasionally in favor of recovering the system quickly (i.e., maintaining service availability) in the event of a partial system failure.

Having thus described a preferred embodiment of a distributed computing system clustering model, it should be apparent to those skilled in the art that certain advantages of the invention have been achieved. It should also be appreciated that various modifications, adaptations, and alternative embodiments thereof may be made within the scope and spirit of the present invention. The invention is defined by the following claims.

What is claimed is:

1. A distributed computing system, comprising:
    a primary server having a primary virtual shared memory;
    a back-up server having a back-up virtual shared memory, said primary server periodically providing a state table to said back-up server in order to synchronize said virtual shared memory and said back-up virtual shared memory; and
    at least one client coupled to said primary server and said back-up server through a network, said at least one client comprising at least one worker process adapted to independently perform an operation on at least one data object disposed within at least one of said primary virtual shared memory and said back-up virtual shared memory without a predetermined assignment of said at least one worker process to said at least one data object;
    wherein, upon either said primary server or said back-up server being unavailable, said at least one worker process performs said operation on said at least one data object disposed within a remaining available one of said primary virtual shared memory or said back-up virtual shared memory; and
    wherein, data objects corresponding to real-time data processing requirements are continuously added to at least one of said primary virtual shared memory and said back-up virtual shared memory for operation on by said at least one worker process, and are continuously withdrawn from said at least one of said primary virtual shared memory and said back-up virtual shared memory following completion of said operations.

2. The distributed computing system of claim 1, wherein said at least one client further comprises plural input/output (I/O) ports adapted to receive incoming data packets and transmit outgoing data packets.

3. The distributed computing system of claim 2, wherein said at least one worker process further comprises an input worker process adapted to retrieve a data packet from at least one of said plural I/O ports for inputting and outputting data and to place a corresponding data object on at least one of said primary virtual shared memory and said back-up virtual shared memory.

4. The distributed computing system of claim 2, wherein said at least one worker process further comprises an output worker process adapted to remove a data object from at least one of said primary virtual shared memory and said back-up virtual shared memory and deliver a data packet to one of said plural I/O ports for inputting and outputting data.

5. The distributed computing system of claim 1, wherein said at least one client further comprises software instructions executable to provide said at least one worker process comprising:
    grabbing a first data object having a predefined pattern from at least one of said primary virtual shared memory and said back-up virtual shared memory;
    processing said grabbed first data object in accordance with a predefined function; and
    returning a modified first data object to at least one of said primary virtual shared memory and said back-up virtual shared memory.

6. The distributed computing system of claim 1, wherein said primary server further comprises a persistent storage device, said at least one data object being selectively stored in said persistent storage device if said operation performed by said at least one worker process and said at least one data object is creating said at least one data object and if said at least one worker process performs a second operation that identifies said at least one data object as persistent.

7. The distributed computing system of claim 1, wherein said primary server provides said state table to said back-up server upon the change in state of any data object within said virtual shared memory.

8. The distributed computing system of claim 1, wherein said at least one data object further comprises plural types of data objects.

9. The distributed computing system of claim 1, wherein said at least one worker process further comprises plural types of worker processes.

10. The method of claim 1, wherein said at least one data object further comprises a tuple.

11. A method for processing data, comprising:
    placing plural data objects corresponding to real-time data processing requirements on a primary virtual shared memory;
    synchronizing a back-up virtual shared memory with said primary virtual shared memory;
    executing at least one worker process on at least one of said plural data objects disposed within said primary virtual shared memory without a predetermined assignment of said worker process to said data object;
    withdrawing said at least one of said plural data objects from said primary virtual shared memory following completion of said at least one worker process; and
    upon said primary virtual shared memory being unavailable, executing said worker process automatically on said data object disposed within said back-up virtual shared memory.

12. The method of claim 11, wherein said placing step further comprises receiving incoming data packets from an external network and placing a corresponding data object on said primary virtual shared memory.

13. The method of claim 11, wherein said withdrawing step further comprises removing a data object from said primary virtual shared memory and transmitting a corresponding data packet to an external network.

14. The method of claim 11, wherein said executing step further comprises:
    grabbing a first data object having a predefined pattern from said primary virtual shared memory;

processing said first data object in accordance with a predefined function; and returning a second data object based on a modification of said first data object to said primary virtual shared memory.

15. The method of claim 11, further comprising selectively storing at least one of said plural data objects in a non-volatile memory if an operation performed by a first worker process on said at least one of said data objects is creating said at least one of said plural data objects and if said first worker process performs a second operation that identifies said at least one of said plural data objects as persistent.

16. The method of claim 11, further comprising transferring a state table between said primary virtual shared memory and said back-up virtual shared memory.

17. The method of claim 11, wherein said plural data objects comprise a plurality of tuples.

* * * * *